United States Patent
Althen et al.

(10) Patent No.: US 8,510,122 B2
(45) Date of Patent: Aug. 13, 2013

(54) METHOD AND SYSTEM FOR REDUCING ENERGY COSTS IN AN INDUSTRIALLY OPERATED FACILITY

(75) Inventors: Sebastian Althen, Munich (DE);
Kersten-Karl Barth, Erlangen (DE);
Lars Beha, Nuremberg (DE)

(73) Assignee: Siemens Aktiengesellschaft, München (DE)

( * ) Notice: Subject to any disclaimer, the term of this patent is extended or adjusted under 35 U.S.C. 154(b) by 1774 days.

(21) Appl. No.: 10/565,950

(22) PCT Filed: Jul. 27, 2004

(86) PCT No.: PCT/US2004/024076
§ 371 (c)(1),
(2), (4) Date: Oct. 24, 2006

(87) PCT Pub. No.: WO2005/012464
PCT Pub. Date: Feb. 10, 2005

(65) Prior Publication Data
US 2007/0061153 A1   Mar. 15, 2007

Related U.S. Application Data

(60) Provisional application No. 60/519,401, filed on Nov. 12, 2003.

(51) Int. Cl.
*G06Q 10/00* (2006.01)

(52) U.S. Cl.
USPC .................................. 705/1.1; 700/177

(58) Field of Classification Search
USPC ........................ 705/1, 1.1; 700/177
See application file for complete search history.

(56) References Cited

U.S. PATENT DOCUMENTS

| | | | |
|---|---|---|---|
| 5,105,365 A * | 4/1992 | McDaniel et al. | 702/24 |
| 6,535,859 B1 | 3/2003 | Yablonowski et al. | |
| 6,587,754 B2 * | 7/2003 | Hung et al. | 700/286 |
| 2002/0007388 A1 | 1/2002 | Bannai et al. | |
| 2002/0035496 A1 | 3/2002 | Fukushima et al. | |
| 2002/0040356 A1 | 4/2002 | Gluck et al. | |
| 2003/0033165 A1 | 2/2003 | Inoue et al. | |

FOREIGN PATENT DOCUMENTS

EP    0 803 956 B1    6/2001

* cited by examiner

*Primary Examiner* — Heidi Kelley

(57) ABSTRACT

Method for reducing energy costs in an industrially operated facility. For a lasting and comprehensive reduction in the energy costs in an industrially operated facility, the invention provides for at least one of the energy flows of the facility, from its purchase, its conversion in at least one secondary process, its consumption in at least one core process, as far as its discharge from the facility, to be considered as a whole, taking account of the operational process sequences, and for potential cost reductions to be determined.

14 Claims, 7 Drawing Sheets

METHOD AND SYSTEM FOR REDUCING ENERGY COSTS IN AN INDUSTRIALLY OPERATED FACILITY

CROSS REFERENCE TO RELATED APPLICATION

This application is the US National Stage of International Application No. PCT/US2004/024076, filed Jul. 27, 2004 and claims the benefit thereof. The International Application claims the benefits of U.S. Provisional application No. 60/519,401 filed Nov. 12, 2003. The Provisional application claims the benefits of German Patent application No. 10334397.0 filed Jul. 28, 2003. All of the applications are incorporated by reference herein in their entirety

FIELD OF THE INVENTION

The invention relates to a method for reducing energy costs in an industrially operated facility, as claimed the claims, and a system suitable for implementing the method, as claimed the claims.

BACKGROUND OF THE INVENTION

Industrially operated facilities, such as production facilities, hospitals, airports or large municipal authorities usually concentrate on their core area of competence, for example the production process or the service provision process, with the aim of improving the quality of the products or services, reducing the production costs thereof and so on. The energy needed for this purpose is provided by one or more secondary processes outside the core area of competence and primarily represents a cost factor for the facility. However, this can make up a considerable part of the operating costs of the industrially operated facility. In addition to electricity and fossil fuels (gas, oil), water consumption, for example, (for example for steam generation) also represents such a cost factor.

Owing to rising energy prices, the increased pressure on costs arising from competition and, not least, owing to the implementation of the Kyoto protocol and the laws derived from this, measures for reducing the energy costs per item produced or per service unit are increasingly necessary and of interest to the industrially operated facilities. For this reason, various solutions have already been developed for increasing the energy efficiency and reducing energy costs. Various energy service companies offer their services for the development, implementation and financing of projects for increasing energy efficiency and reducing energy costs.

A method and a system for optimizing and managing the consumption of electrical energy in industrial facilities is disclosed, for example, by EP 0 803 956 B 1. In this case, the total consumption and the consumption of each specific consumer are measured for an operating sequence and, from this, the connection or disconnection of individual consumers during the operating sequence is determined.

US 2002/0035496 A1 discloses a method and a system for implementing and financing energy-saving measures by an energy service company on the premises of a customer.

In addition, a large number of individual measures for saving energy in ventilation and air-conditioning systems, in the area of lighting and in electric drives are known.

SUMMARY OF THE INVENTION

However, the known methods are not sufficient to effect a comprehensive and lasting reduction in the energy costs in complex industrially operated facilities.

It is therefore an object of the present invention to specify a method with which the energy costs of an industrially operated facility can be reduced comprehensively and in a lasting manner. Furthermore, a system suitable for implementing the method is to be specified.

According to the invention, the object directed to the method is achieved by a method as claimed in the claims. Advantageous refinements of the method are in each case the subject of the subclaims. A system suitable for the implementation of this method is the subject of the claims. Advantageous refinements of the system are in each case the subject of the subclaims.

The invention is based on the thought that each industrially operated facility has at least one core process and at least one secondary process. The core process is a technological process (i.e. specific to a sector of industry) whose main focus contains the sector-specific know-how of the facility. In the case of a production facility, this is the production process, in the case of a service facility the service provision process. The technically marked (i.e. substantially independent of the sector of industry) secondary processes support the core process by providing it with the necessary energy and resources (for example steam, compressed air, power). Also relevant in terms of energy is the purchase of energy (for example the purchase of electricity, gas, oil, water) and the discharge of energy (for example the discharge of $CO_2$, emissions, waste water). The operational process sequences are subordinate to these processes. These are determined, for example, by the organization of the facility, the facility management and maintenance processes, procurement management, financial management, reporting and the training of the employees of the facility.

For a lasting reduction in the energy costs, the invention provides for at least one of the energy flows of the facility, from its purchase, its conversion in one or more secondary processes, its consumption in one or more core processes, as far as its discharge from the facility, to be considered as a whole, taking operational process sequences into account, and for potential cost reductions to be determined Including the operational process sequences in considerations for reducing energy costs permits all the technological and technical measures for reducing the energy costs to be assisted by the operational process sequences as well, and thus a lasting and comprehensive reduction in the energy costs is made possible. Since the operational process sequences, as opposed to the core processes, the purchase of energy and the discharge of energy, can in principle be considered irrespective of the sector of industry, a benchmark that is independent of the sector of industry with a large number of other industrially operated facilities is possible in the analysis of the current state of a facility. Such a benchmark can, in a simple way, indicate potentials for reducing the energy costs.

It is only by considering the at least one energy flow as a whole, as envisaged by the invention, that the chronological and spatial distribution of all the energy costs in large and complex facilities can be registered and all the potential cost reductions can be determined and exhausted.

A further reduction in the energy costs is possible as a result of taking into account the information and data-processing systems that support the at least one secondary process and the at least one core process when considering the facility as a whole and determining the potential cost reductions. With the aid of such systems, the energy consumption levels can be measured and allocated to specific consumers, energy flows can be followed and energy-relevant data can be stored and analyzed. Furthermore, the influence of production planning on the energy consumption can be ascertained by means of these systems.

By means of a standardized procedure in the holistic consideration and determination of the potential cost reductions of the at least one energy flow, it is possible to create transparency and consistency in the procedure. Thus, a comprehensive and systematic analysis of the energy costs of the facility is made possible and the determination of the potential cost reductions and the elaboration of measures for reducing the energy costs are made easier. With the aid of the standardized procedure, experience and best practice which is already available in a large number of facilities can be utilized jointly and benchmarks can then be made, for example with an average for the sector. These advantages become especially clear when the standardized procedure can be applied beyond the sector of industry and worldwide. Furthermore, by means of the standardized procedure, systematic working under clearly defined rules is made possible and quality control and assurance is made easier. In spite of the high complexity of a facility, all the potentials for reducing the energy costs can thus be determined and exhausted.

In this case, the standardized procedure advantageously comprises a number of standardized steps. By means of this stepwise procedure, the complexity of the facility can be reduced further and thus the planning for the implementation of the method can be simplified, high transparency with respect to the progress of the method can be created and its control can be simplified. In addition, when carrying out the method in accordance with the various steps, a distribution of responsibilities can be made in a simple way. For example, the individual steps can be carried out by different persons with different areas of responsibility in each case.

An initial assessment of the facility with regard to existing potentials for reducing the energy costs is made possible by the fact that, in a first step, with the aid of a standardized diagnostic method, the operational process sequences are analyzed, weak points are identified and measures for improvement are elaborated. Since the operational process sequences can be viewed as independent of the sector of industry, the diagnosis thereof permits a benchmark with a large number of facilities not only from the same sector but also from other sectors. Thus, the assessment of the facility is possible in a simple and rapid way. The "technique" of the at least one secondary process or the "technology" of the at least one core process do not yet have to be taken into account at this point. Since the standardized diagnostic method can be used in a large number of sectors of industry because of its concentration on the operational process sequences which are independent of the sector, for an individual facility it can represent an economic introduction to the method for reducing energy costs.

In the context of the standardized diagnostic method, the operational process sequences are advantageously diagnosed using predefined, energy-relevant questions which are independent of the sector of industry. These questions can be obtained by dividing the operational process sequences of companies of an extremely wide range of sectors into various energy-relevant individual processes at the start, that is to say before implementing the method, and identifying typical problems for these individual processes.

Following the analysis of the operational working sequences, the at least one core process, the at least one secondary process, the purchase and discharge of energy and the information and data-processing systems can be analyzed in a further step with the aid of a standardized analysis method, weak points can be identified and measures for improvement can be proposed.

In the scope of the standardized analysis method, standardized concepts, standardized calculation models and standardized process analyses for determining potentials for reducing energy costs are advantageously used. It is possible to make use both of best practice and already available experience. During analysis, this permits recourse to be made to successful and proven concepts, calculation models and process analyses, and therefore enables particularly good potential savings to be determined.

In a further step, detailed planning of the improvement measures for reducing the energy costs and, in still another step, their implementation can be carried out.

A particularly lasting reduction in the energy costs is made possible by the fact that the first step is repeated after a time interval, in particular at the latest after a year. In this way it is possible, firstly, to check whether the measures, in particular at the level of the operational process sequences, have been implemented correctly. Secondly, the effectiveness of the measures for reducing the energy costs and the achievement of best practice can be checked.

BRIEF DESCRIPTION OF THE DRAWINGS

The invention and further advantageous refinements of the invention according to features of the subclaims will be explained in more detail in the following text using the exemplary embodiments in the figures in which, in a simplified form:

DETAILED DESCRIPTION OF THE INVENTION

Figure 1:
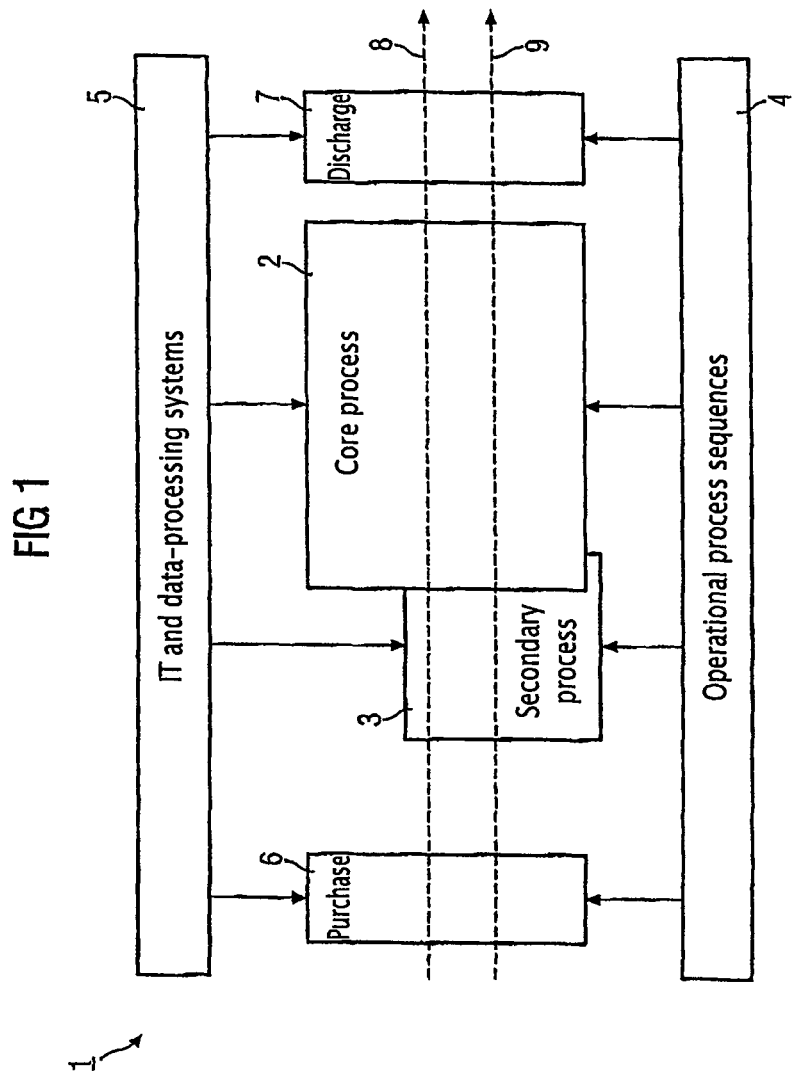
FIG. 1 shows two energy flows in an industrially operated facility.

An industrially operated facility 1 shown in FIG. 1 has a core process 2 and a secondary process 3. The industrially operated facility 1 is, for example, a production facility such as a pulp and paper mill. The core process of this factory is the pulp and paper production process. For the core process 2, steam and compressed air, among other things, are needed and these are produced in the secondary process 3. The energy and resources (such as electricity, gas, oil, water) needed for the production of the steam and of the compressed air in the secondary process 3 but also for the core process 2 are bought in via a purchasing unit 6. Energy (for example in the form of heat) or emissions are discharged from the area of the core process and of the secondary processes via the discharge unit 7. The operational process sequences 4 are subordinate to the core process 2, the secondary process 3, the purchasing unit 6 and the discharge unit 7. These operational process sequences comprise, in particular, the organization, the facility management and maintenance processes, the procurement management, financial management, the reporting and the training of the employees of the facility 1. Superimposed on the core process 2, the secondary process 3, the purchasing unit 6, the discharge unit 7 are IT and data-processing systems 5 which support them, such as a manufacturing execution system (MES).

An energy flow 8 and an energy flow 9 run from the purchasing unit 6 via the conversion in the secondary process 3, the consumption in the core process 2 as far as the discharge unit 7. An energy flow 8 or 9 of this kind can be, for example, electrical energy, which is used in the secondary process 3 for producing compressed air for the core process 2.

In order to reduce the energy costs (for example per item produced, in the case of the pulp and paper mill, per tonne of pulp or paper produced), at least the energy flow 8 is considered as a whole, that is to say from the purchase unit 6 via its conversion in the secondary process 3, its consumption in the core process 2, as far as the discharge unit 7, taking account of the operational process sequences 4, and potential cost reductions are determined. Then, by using the potential cost reductions determined, detailed planning of measures for improvement can be carried out and a reduction in the energy costs can be achieved by their implementation.

In the case of the energy flow already mentioned for producing compressed air for the core process, the holistic consideration of the energy flow and the determination of potential cost reductions comprises, for example, the purchase of electrical energy, the conversion of the electrical energy into compressed air in a compressor, oil separator and dryer unit, the distribution of the compressed air in the facility, as far as the consumption of the compressed air in the core process.

Figure 2:
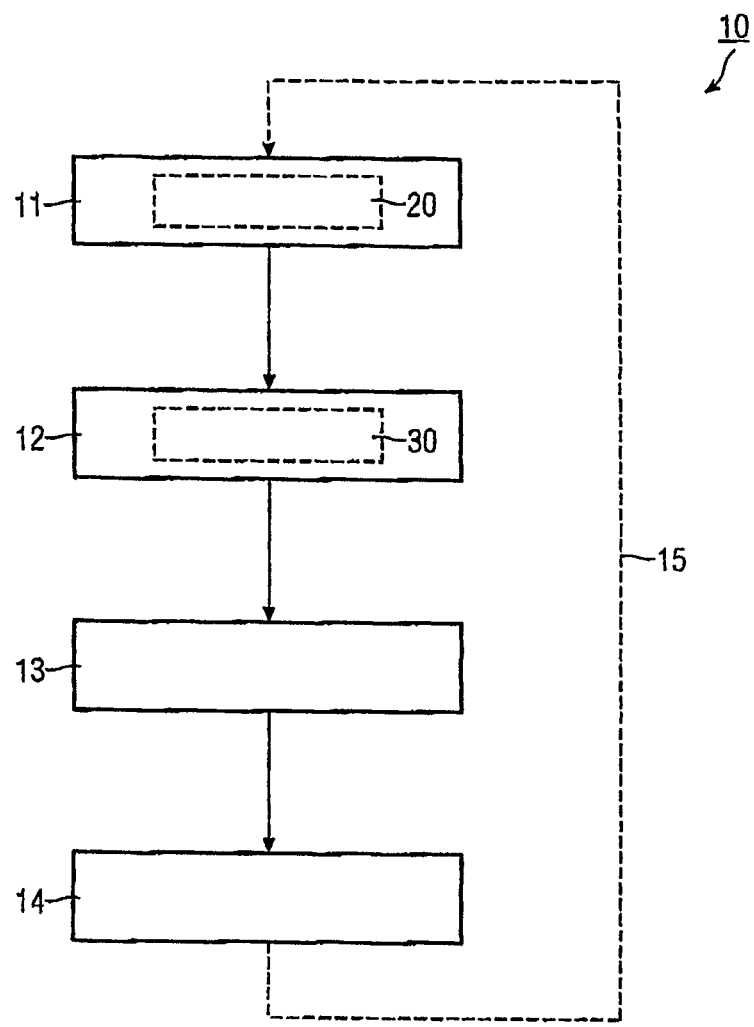
FIG. 2 shows a sequence of method steps for reducing the energy costs.

According to FIG. 2, the holistic consideration and optimization are carried out in the context of a standardized procedure 10 having a number of standardized method steps 11-14 following one another.

In a first method step 11, the energy-relevant operational process sequences 4 are analyzed by using a standardized diagnostic method 20, weak points are identified and measures for improvement are elaborated. In this case, the standardized diagnostic method 20 advantageously comprises a computer-aided interview of employees of the facility, in particular from the upper or middle management (for example plant manager, maintenance manager, controller).

Following the method step 11, a further, second method step 12 provides for an analysis of the core process 2, of the secondary process 3, of the purchasing unit 6 and discharge unit 7 and also of the supporting information and data-processing systems 5 with the aid of a standardized analysis method 30. Here, weak points are identified and measures for improvement are proposed.

Following the method step 12, planning of the measures for improvement for reducing the energy costs can be carried out in a further, third method step 13. Here, provision is made for some, possibly even all, of the measures for reducing the energy costs found in the context of the standardized analysis method 30 of the method step 12 to be worked out in more detail. This includes investment planning and a determination of the payback period. The individual details can be combined to form an overall concept.

For the facility 1, there is the possibility, within the limits of the possible finance and time available to it, of taking up all or only some of the measures found in the context of method step 12 and of using them in planning in method step 13. In the scope of the planning, for example in the case of the pulp and paper mill, a proposal for an optimum power supply contract, a fine analysis of the heat-energy consumption and measures for improvement based on this or a new concept for producing compressed air can be elaborated. Each of these measures is associated with investment planning and a determination of the payback period.

The planning of the measures in method step 13 can be followed, in a further, fourth method step 14, by the implementation of the measures for reducing the energy costs. This implementation can be made by the facility itself or by internal or external partners. A particularly economical form of implementation would be for the facility 1 to include external partners in the financing of the measures and for them to participate in the energy cost savings.

For a particularly lasting reduction in the energy costs, it is envisaged that, after implementation of the measures for reducing the energy costs has been carried out in method step 14, a repetition of method step 11 with the standardized diagnostic method 20 for the analysis of the operational sequences is carried out after a time interval, in particular at the latest after a year. This is indicated in FIG. 2 by the dashed connecting line 15. It is thus possible to check the effectiveness of the measures carried out previously for reducing the energy costs, to carry out another benchmark with other companies and, if considered necessary, to achieve a further reduction in the energy costs by repeating method steps 12 to 14 again.

According to a particularly advantageous refinement of the invention, provision is made for the holistic consideration and determination of potential cost reductions for the energy flow 8 to be carried out, at least to some extent, by an energy service provider. In particular, a globally active energy service provider who operates in various sectors of industry can bring in a wide range of expert knowledge and tried and tested standardized procedures on the basis of his experiences in a large number of projects. The energy service provider can participate in the energy saving by receiving payment dependent on performance.

Commissioning such an energy service provider enables the facility to concentrate further on its core areas of competence and to entrust the diagnosis, analysis, planning and implementation of the measures for reducing the energy costs to a competent partner. By involving the service provider not just in the analysis and planning but in particular in the implementation as well, it is possible to ensure that all the measures are also implemented. At the same time, however, with the cooperation of the service provider, monitoring and, if appropriate, verification of the savings calculated by the service provider can be carried out.

Figure 3:
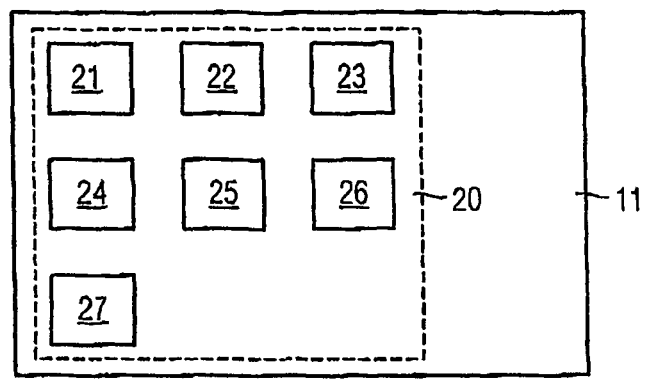
FIG. 3 shows a detailed illustration of a standardized diagnostic method for analyzing operational process sequences.

FIG. 3 shows a detailed illustration of the standardized diagnostic method 20 for the analysis of the operational process sequences, envisaged in method step 11 according to FIG. 2. A particularly efficient and quick first assessment is made possible by the fact that the diagnosis is carried out in the form of a computer-aided interview of employees of the facility, in particular from the upper or middle management (e.g. plant manager level).

The operational process sequences are diagnosed by using predefined energy-relevant questions 21-27 which are independent of the sector of industry. The questions 21-27 are, in particular, questions 21 in the area of planning (targets, performance indicators and motivations), questions 22 with respect to the people active in the facility (responsibilities, awareness and training, provision of resources), questions 23 from the area of operation and maintenance (operational sequences, maintenance), questions 24 relating to procurement management (purchasing methods, quality and reliability, purchase optimization), questions 25 relating to financial management (capital investment, operational energy budgets), questions 26 with respect to monitoring and reporting (measuring and monitoring, control systems, documentation and markings) and also questions 27 relating to the plant and equipment (for example purchasing and replacement processes, innovation).

As a result of the questions 21-27, a report is drawn up in which, inter alia, weak points are indicated, a few top measures are proposed and first potential savings are enumerated. The report is advantageously generated automatically. In order to assess the facility as compared with other facilities, benchmarking is carried out. Since the standardized diagnostic method 20 concentrates only on the operational process sequences that are independent of the sector of industry, and not on the respective core process 2 which depends on the sector of industry, a benchmark with a large number of companies is possible.

Figure 4:
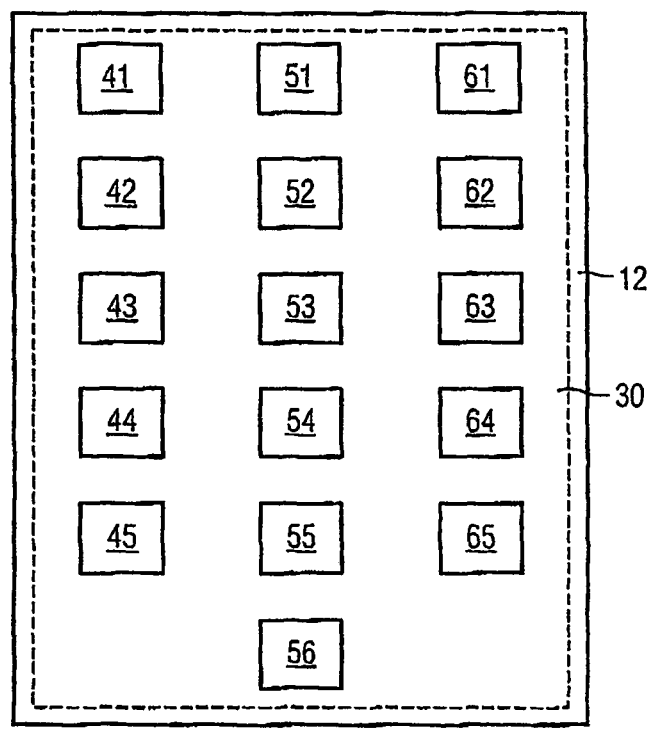
FIG. 4 shows a detailed illustration of a standardized analysis method for analyzing core process, secondary process, energy purchase and discharge, and IT and data-processing systems.

FIG. 4 shows a detailed illustration of the standardized analysis method 30 of the method step 12 according to FIG. 2 for the analysis of core process, secondary process, purchase and discharge and IT and data-processing systems. Within the scope of the standardized analysis method 30, standardized concepts, standardized calculation models and standardized process analyses are used to determine potentials for reducing the energy costs. The analysis of the core process is carried out with the aid of predefined standardized analysis packages 41-45 for the core process which are dependent on the sector of industry, the analysis of the secondary process is carried out with the aid of predefined standardized analysis packages 51-56 for the secondary process which are independent of the sector of industry, and the analysis of the supporting information and data-processing systems and/or of the purchase and/or of the discharge is carried out with the aid of predefined, standardized analysis packages 61-65.

The standardized analysis packages can be predefined on the basis of the experience of a large number of analyses and measures for improvement carried out in other facilities. An individual facility can thus participate in this experience and a high quality of the analysis can be achieved. Secondly, by means of the standardized analysis packages, responsibilities and parallel sequences can be delimited accurately; and therefore the implementation of the method can be systemized and simplified.

In the case of a pulp and paper mill, the standardized analysis packages 41-45 for the core process, that is to say the pulp and paper production process, are, for example, standardized calculation models 41 and process analyses 42 for energy optimization of the pulpers, standardized calculation models 43 to compensate for residence times, standardized process analyses 44 with regard to the overheating of dryer groups and standardized concepts 45 relating to grade changes.

The standardized analysis packages 51-56 of the secondary process, the purchasing and the discharge comprise, for example, standardized calculation models 51 and process analyses 52 for using the waste gas from gas turbines, standardized concepts 53 for safe stand-alone operation, standardized concepts 54 for the analysis of compressed air production and standardized calculation models 55 for a reducer station for process steam. In addition, standardized concepts 56 for taking country-specific regulations into account, in particular standards, and/or subsidies and/or financial aids can be taken into account.

The standardized analysis packages 61-65 for the analysis of the supporting IT and data-processing systems (for example MES systems) comprise, for example, standardized calculation models 61 and process analyses 62 for downtime planning, standardized calculation models 63 for systematic shutdowns, standardized concepts 64 for analyzing the Level 2 automation and standardized process analyses 65 for steam optimization in the event of failure and restarting.

The result of the standardized analysis method 30 is a list of measures of a technical and technological nature which can be implemented directly, which indicates potential cost reductions and makes recommendations on how to proceed further.

If the method is implemented by an energy service provider, the analysis packages 41-45, 51-56, 61-65 are advantageously service packages which are predefined by the service provider and offered to the facility at a specific price.

Figure 5:
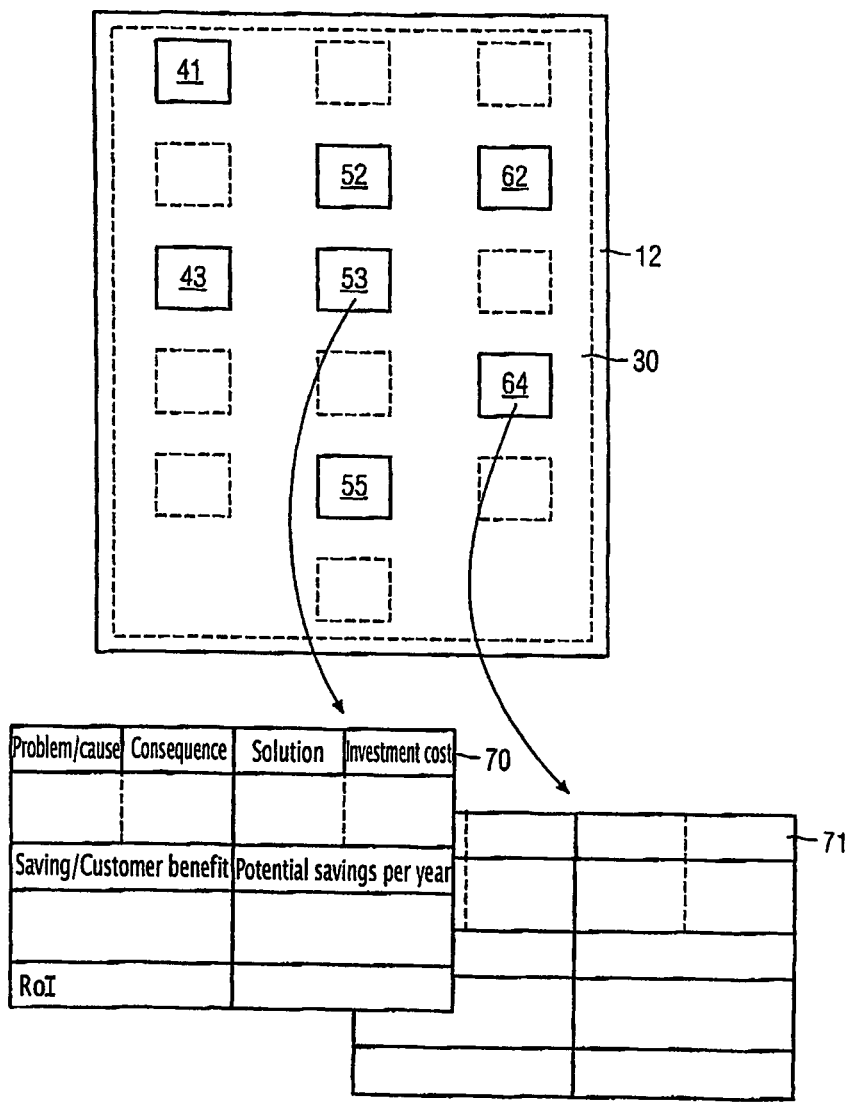
FIG. 5 shows a standardized analysis method adapted to a specific facility, with an illustration of the results obtained therefrom.

In order to adapt the standardized analysis method 30 to the finance and time available to the industrial facility, it is possible, as FIG. 5 illustrates, to make a specific selection from the standardized analysis packages 41-45, 51-56 and 61-65 for the specific facility. In the case of FIG. 5, for example, the analysis packages 41, 43, 52, 53, 55, 62 and 64 are selected by the facility. As a result of each of the selected analysis packages, one or more proposed measures are drawn up, which each indicate a description of the problem or its cause, the consequence of the problem and a solution to the problem and the investment costs required for this. Furthermore, the customer benefit resulting from the proposed solution to the problem, the potential savings (for example per year) and the amortization time are indicated. As an example, two proposed measures 70, 71 are shown in FIG. 5 as a result of the selected analysis packages 53 and 64.

Figure 6:
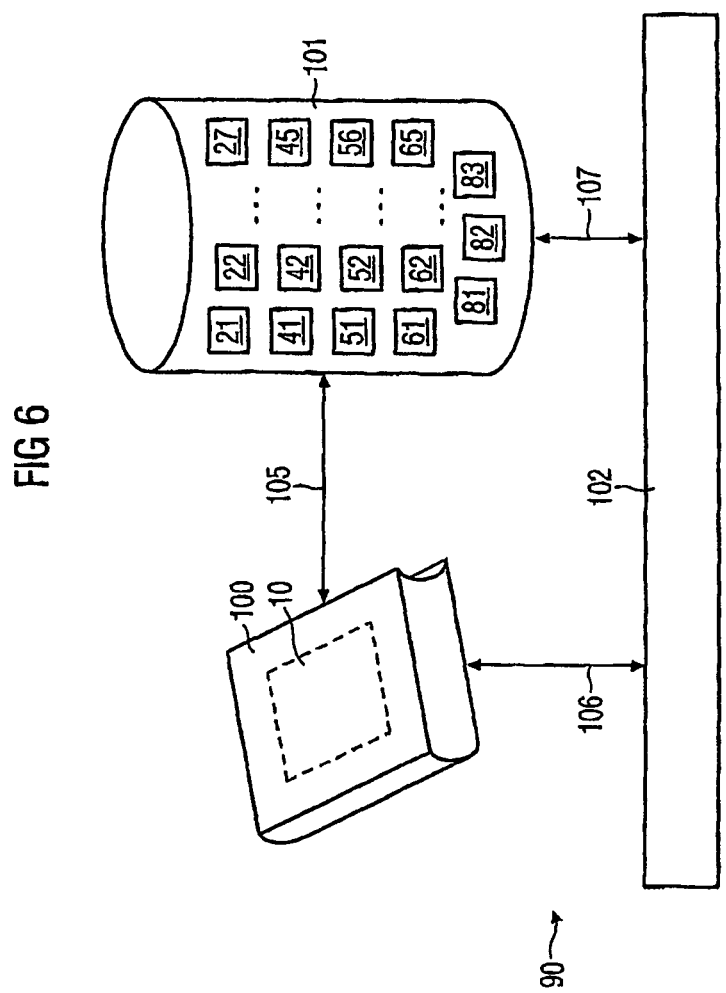
FIG. 6 shows a method-supported system.

The method explained in FIGS. 1 to 5 can be supported to special advantage by a system 90 illustrated in FIG. 6. The main components of the system 90 are a method handbook 100, a knowledge database 101 and hardware and software tools 102.

The method handbook 100 predefines the standardized procedure 10 according to FIG. 2 for reducing the energy costs. The method handbook 100 can be available in many forms. It can be available on paper, for example, electronically, stored on an extremely wide range of computer media, such as magnetic or optical memories, or available via a network connection such as the Internet, in particular the World Wide Web.

Experience obtained globally or regionally in connection with the reduction of energy costs can be collected in the knowledge database 101 and can be used locally in a facility for reducing the energy costs. The knowledge database 101 not only contains data but also experts 81 with broad technological or technical knowledge, and provides this knowledge locally, regionally or globally. Important contents are represented by the predefined questions 21-27 and benchmark data 82 stored in the knowledge database 101 and needed for the standardized diagnostic methods 20 for the analysis of the operational working sequences according to FIG. 3. The knowledge database 101 also contains the standardized concepts, standardized calculation models and standardized process analyses for determining potential ways of reducing the energy costs, used in the context of the standardized analysis method 30 according to FIG. 4. These are available in the form of predefined standardized analysis packages (service packages) 41-45, 51-56, 61-65. In addition, the knowledge database 101 contains knowledge 83 about the planning and the implementation of measures for reducing energy costs. This includes in particular knowledge about business models and service-based contracts.

The software and hardware tools 102 are used to support the standardized procedure 10 for reducing the energy costs (for example by means of control tools), the implementation of the standardized diagnostic method for the analysis of the operational process sequences (in particular for the computer-aided interviews, automatic generation of reports), and also the analysis packages 41-45, 51-56, 61-65 (for example tools for energy consumption analyses and forecasts, process analyses, thermodynamic calculations, drawing up reports). The tools can be made available to the facility locally via a stand-alone application, a network application or via a web-based ASP (application service provider).

The method handbook 100, the knowledge database 101 and the tools 102 are linked to one another, as indicated by the arrows 106, 107 and 108. These links will be explained in detail later.

The division outlined into methods (procedure), knowledge and supporting tools and their deposition in respectively self-contained components (method handbook 100, knowledge database 101, tools 102) is suitable in particular for globally active energy service providers for the systematic acquisition and deposition of all the experience obtained globally, best practice and the tools available in connection with the reduction of energy costs in industrial facilities, and their provision locally or regionally and the availability of energy services for these and further facilities.

Figure 7:
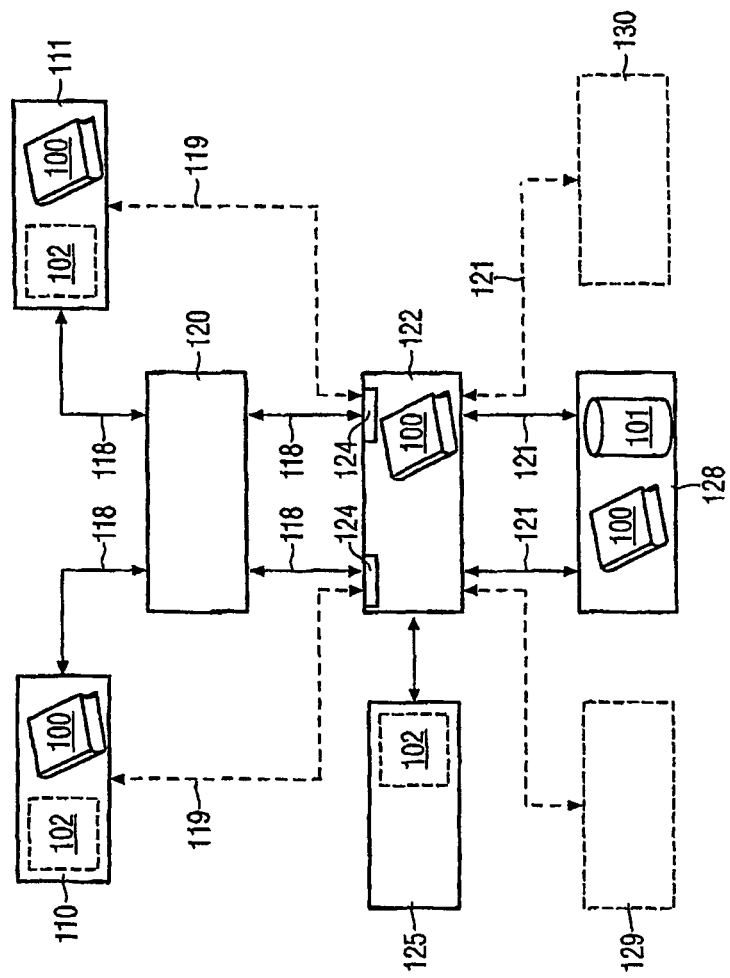
FIG. 7 shows a functional block diagram of the communication, between an industrially operated facility and a knowledge center.

FIG. 7 shows how the method handbook 100, the knowledge database 101 and the hardware and software tools 102 can be provided in two facilities 110, 111 by an energy service provider 122. In each case a communications channel 118, either using wire or wire-free, connects the facilities 110, 111 to a network 120, such as the Internet, and specifically the World Wide Web of the Internet. Via the network 120 there is access provided in the facilities 110, 111 to the energy service provider 122 and energy services for implementing the method according to FIGS. 1-5. The communications channels 118 preferably include a firewall 124 in order to ensure the security of data with the energy service provider 122. Via the energy service provider 122 and communications channel 121 there is access to a knowledge center 128 in which the knowledge database 101 is located.

The facilities 110, 111 are thus able to use the communications channels 118 and 121 to tap into the expert knowledge 81, the predefined, energy-relevant questions 21-27 independent of the sector of industry and the diagnosis of the operational working sequences, the benchmark data 82 and also the predefined standardized analysis packages (or service packages) 41-45, 51-56, 61-65 from the knowledge database 101. Conversely, benchmark results from the analysis of the operational process sequences, results from the analysis of the core processes, the secondary processes, the IT and data-processing systems and so on, as well as experience relating to the analysis packages (service packages) used in the standardized concepts, calculation models and process analyses are reported back to the knowledge center 128 by the facilities 110, 111.

The communications channels between the elements of FIG. 7 are preferably secure connections, for example as a result of the use of cryptography and/or other security means. Alternatively, the communications channels between the facilities 110, 111 and the energy service provider 122 and/or the knowledge center 128 can be implemented by means of a dedicated telephone line or an internal network connection, as indicated by the connection 119. For security reasons, the connections 119 are also led through firewalls 124.

Each of the facilities 110 and 111 has the hardware and software tools 102 available, as indicated in FIG. 7. However, the tools do not necessarily have to be installed on site in the facilities 110 and 111, but can also be made available via the network 120. For this purpose, the energy service provider 122 offers the possibility of application hosting 125.

The method handbook 100 gives predefinitions of the procedure and the interplay of those involved and is in each case available both in the knowledge center 128, with the energy service provider 122 and in the facilities 110, 111, or access to the method handbook is possible there.

In the exemplary embodiment of FIG. 7 it is assumed that the knowledge center 128 possesses knowledge about country specifics (for example country-specific standards and regulations, energy markets, energy prices). This knowledge can, however, also be available decentrally for individual regions in further, regional knowledge centers 129, 130 indicated by dashed lines.

For a particularly lasting and comprehensive reduction of the energy costs in industrially operated facilities, the experience obtained in one facility is used both for the further reduction of the energy costs in this facility and also in the optimization of the method for other facilities.

Figure 8:
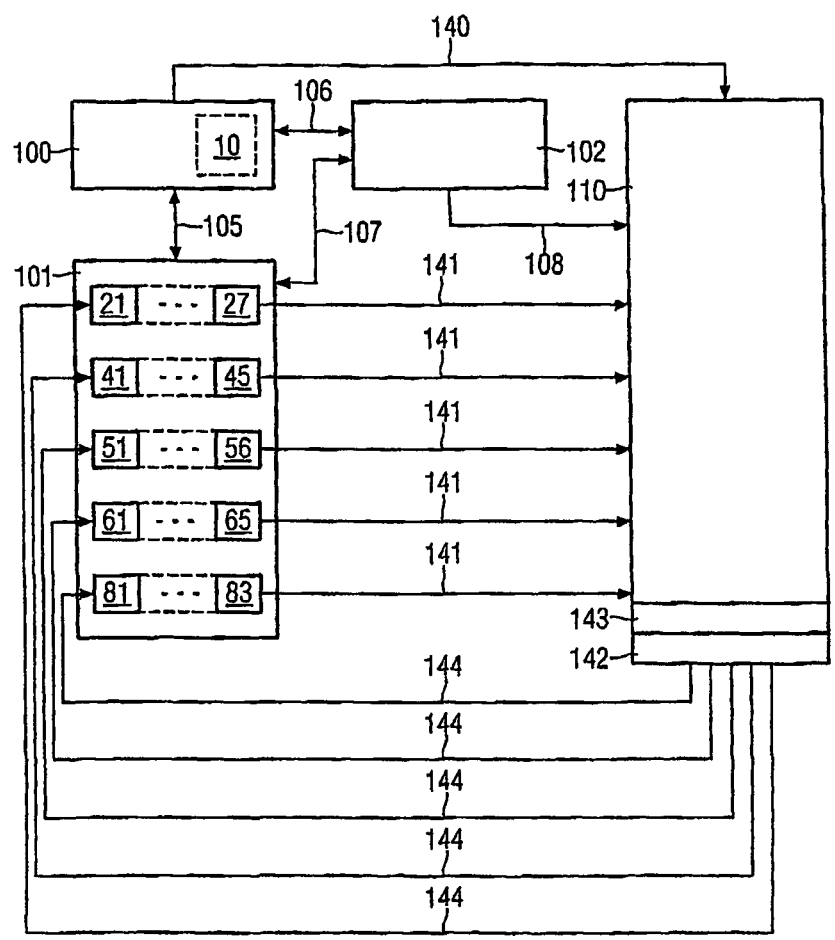
FIG. 8 shows a functional block diagram of the optimization of a knowledge database in a knowledge center.

This is intended to be illustrated with the aid of the functional block diagram of FIG. 8. The method handbook 100 contains references 105 to the knowledge database 101. The knowledge database 101 has data and method connections 107 to the hardware and software tools 102, and the tools 102 provide reference connections 106 back to the method handbook 100. The method handbook 100 predefines the standardized procedure 10 for reducing energy costs in the facility 110, as indicated by an arrow 140. As the arrow 108 indicates, the tools 102 support the standardized procedure and the analyses in the facility 110.

For the implementation of the various steps of the method for reducing the energy costs, the predefined questions 21-27, the benchmark results 82, the predefined analysis packages 41-45, 51-56, 61-65, knowledge 83 about planning and implementation and also further expert knowledge 81 are made available to the facility 110 from the knowledge database 101, as indicated by arrows 141.

Within the context of implementing the method in the facility 110, experience 142 and results 143 (for example benchmark results) are obtained. As indicated by the arrows 144, these are transmitted back to the knowledge database 101 and are used there for optimizing the stored, predefined questions 21-27 and/or the analysis packages (or service packages) 41-47, 51-56, 61-65, and also for updating and optimizing the expert knowledge 81, the benchmark results 82 and the knowledge 83 relating to planning and implementation.

The experience gained in the facility 110 can thus be incorporated in all the current and future diagnoses and analyses and in the planning and implementation of measures for reducing the energy costs both in the facility 110 and also in other facilities and can therefore lead to a particularly lasting and comprehensive reduction of the energy costs in these facilities.

The method according to the invention is suitable in particular for reducing the energy costs in complex facilities such as paper and pulp production facilities, steelworks, hospitals, airports, large municipal authorities, shipyards, hotels, chemical plants, cement factories, underground systems, railway systems, container terminals or drilling rigs.

The invention claimed is:

1. A method for reducing energy costs in an industrially operated facility having a core process specific to a sector of industry, a secondary process supporting the core process that provides energy to the core process, a purchasing unit for purchasing energy, and a discharge unit for discharge of energy, the method comprising:

accessing on an interconnected computer network a predefined two-part standardized procedure for reducing energy costs comprising a first standardized diagnostic method that analyses energy-relevant operational processes using diagnostics that are independent of the sector industry allowing benchmarking based on a large number of companies across a plurality of industry sectors and a second standardized analysis method selected from a plurality of standardized analysis packages each specific to particular sector of industry, said first standardized diagnostic method and said second standardized analysis method implemented by:

(a) analyzing and benchmarking a plurality of energy-relevant operational process sequences of the facility using the first standardized diagnostic method by analyzing answers to predefined energy-relevant questions which are independent of the sector of industry, performed within the facility by the first standardized diagnostic method implementable on the interconnected computer network having access to a stored knowledgebase, wherein the first standardized diagnostic method analyzes answers to the predefined energy-relevant questions from the knowledgebase to identify and generate a report indicating areas where improvement to the sequences can be attained and benchmarking the facility as compared to other facilities, the sequence analysis including consideration of:

energy flows of the core process, secondary process, purchasing unit, and discharge unit of the facility, the energy flow path including:
  purchase of the energy from an energy provider,
  consumption of the energy within the facility in a core process, the core process being a process that is specific to an industry sector whose main focus contains the sector-specific know-how of the facility,
  conversion of the energy in a secondary process, the secondary process being a process that provides the core process with necessary resources for the core process to function, and
  discharge of the energy from the facility;

(b) analyzing the facility using a the second standardized analysis method implementable on the interconnected computer network having access to the stored knowledgebase wherein the second standardized analysis method comprises standardized analysis packages individually selectable by the facility from a plurality of standardized analysis packages for the particular sector of industry of the facility for analyzing the core process, the secondary process, the purchasing unit, and the discharge unit, wherein the second standardized analysis method provides recommendations for reducing energy costs by:
  measuring and allocating to the core and secondary processes the energy consumption levels of the core and secondary processes;
  monitoring energy-relevant data from the core and secondary processes;
  storing energy-relevant data from the core and secondary processes;
  analyzing the energy-relevant data via: determining production planning for the core process and secondary process
  determining energy cost reduction measures for the core and secondary processes based upon the energy-relevant data analysis;

(c) planning energy cost reduction measures based on some or all of the recommendations for reducing energy costs provided by the second standardized analysis method;

(d) implementing the energy cost reduction measures for the core and secondary processes; and (e) repeating step (a) of analyzing and benchmarking the plurality of energy-relevant operational process sequences of the facility, using the first standardized diagnostic method after a predetermined time interval to carry out another benchmark with other facilities to check an effectiveness of the energy cost reduction measures and continuing with process steps (b)-(e) based on the benchmarking.

2. The method for reducing the energy costs as claimed in claim 1, wherein the first standardized diagnostic method comprises a computer aided interview of middle or upper management.

3. The method for reducing the energy costs as claimed in claim 1, wherein the first standardized diagnostic method and the second standardized analysis methods utilize standardized concepts, standardized calculation models, and standardized process analyses to determine potential for reducing energy costs.

4. The method for reducing the energy costs as claimed in claim 3, wherein the analysis of the computerized information, data processing systems and energy purchasing and discharge is performed using a third predefined standardized analysis package.

5. The method for reducing the energy costs as claimed in claim 4, wherein country specific regulations are considered during the energy-relevant analysis step, the regulations selected from the group consisting of: standards, subsidies, and financial aids.

6. The method for reducing the energy costs as claimed in claim 5, wherein the industrial facility is selected from the group consisting of: paper and pulp production facility, steel works, hospital, shipyard, hotel, chemical plant, cement factory, underground system, railway system, container terminal, and drilling rig.

7. The method for reducing the energy costs as claimed in claim 6, wherein the two-part standardized procedure is predefined within a method handbook.

8. The method for reducing the energy costs as claimed in claim 7, wherein the energy-relevant questions and the energy-relevant data analysis are stored in a knowledge database.

9. The method for reducing the energy costs as claimed in claim 8, wherein the questions and energy-relevant data that are stored in the knowledge database are optimized based upon the experience gained by the facility.

10. The method for reducing the energy costs as claimed in claim 9, wherein the process steps are repeated annually to verify the effectiveness and proper implementation of the measures.

11. The method for reducing the energy costs as claimed in claim 10, wherein the cost reduction determination is performed by an energy service provider.

12. A system for implementing energy cost reductions in an industrially operated facility, comprising:

(a) An interconnected computer network used to access a method handbook for predefining a two-part standardized procedure for a holistic consideration of the energy flow through the facility comprising a first standardized diagnostic method that analyses energy-relevant operational processes using diagnostics that are independent of the sector industry allowing benchmarking based on a large number of companies across a plurality of industry sectors and a second standardized analysis method selected from a plurality of standardized analysis packages each specific to a particular sector of industry, the energy flow path including:

purchase of the energy from an energy provider, consumption of the energy within the facility in a core process, the core process being a process that is specific to an industry sector whose main focus contains the sector-specific know-how of the facility, conversion of the energy in a secondary process, the secondary process being a process that provides the core process with necessary resources for the core process to function, discharge of the energy from the facility;

(b) a knowledge database accessible to the facility via the network, comprising:

a plurality of predefined energy-relevant questions that are independent of the industry sector for use by the first standardized diagnostic method for the analysis of the operational process sequence comprising analysis of energy flows of the core process, secondary process, purchasing unit, and discharge unit of the facility; and a plurality of standardized analysis packages that are individually selectable by the facility from a plurality of standardized analysis packages for the particular sector of industry of the facility for analyzing the core process, the secondary process, the purchasing unit, and the discharge unit; and (c) control tools for executing the two-part standardized procedure in order to benchmark the facility with other facilities using the first standardized diagnostic method and to determine potential cost reductions using the second standardized analysis method.

13. The system as claimed in claim 12, wherein the knowledge database is optimized based upon the experience and knowledge gained in the facility.

14. The system as claimed in claim 13, wherein hardware and the control tools are provided to the facility locally or via an interconnected computer network.

* * * * *